United States Patent [19]
Poerink

[11] 3,939,964
[45] Feb. 24, 1976

[54] APRON OR PLATE BELT CONVEYOR

[76] Inventor: Jannes Jonge Poerink, 25 Prins Bernardlaan, Borne, Netherlands

[22] Filed: Apr. 23, 1974

[21] Appl. No.: 463,644

[30] Foreign Application Priority Data
Apr. 26, 1973 Germany............................ 2321036

[52] U.S. Cl.................................. 198/195; 198/182
[51] Int. Cl.².......................................... B65G 17/06
[58] Field of Search ........... 198/181, 182, 189, 193, 198/195

[56] References Cited
UNITED STATES PATENTS

| | | | |
|---|---|---|---|
| 401,285 | 4/1889 | Loree.................. | 198/195 |
| 2,165,422 | 7/1939 | Stanius................ | 198/189 |
| 2,911,091 | 11/1959 | Imse................... | 198/189 |
| 3,367,474 | 2/1968 | Kerr et al............ | 198/195 X |
| 3,674,130 | 7/1972 | Carmichael........... | 198/195 |
| 3,693,780 | 9/1972 | Fraioli................ | 198/182 |
| 3,726,569 | 4/1973 | Maglio et al......... | 198/189 X |
| 3,774,752 | 11/1973 | Harvey................ | 198/195 |
| 3,785,476 | 1/1974 | Poerink............... | 198/189 |

*Primary Examiner*—Evon C. Blunk
*Assistant Examiner*—Richard K. Thomson
*Attorney, Agent, or Firm*—Burgess, Dinklage & Sprung

[57] ABSTRACT

A platform conveyor having two laterally adjacent, interconnected rows each having a plurality of flat panel members of plastic material hingedly connected together along transversely extending edges thereof, the upper surface of the interconnected panel members forming a load supporting surface, a plurality of integrally formed eyes along each transversely extending edge of each of the panel members and being aligned to receive an interconnecting transverse bar member which connects both rows of the panel members together to form the conveyor belt, the eyes on one transversely extending edge of each panel being staggered relative to the eyes on the opposite edge thereof, the transverse bar member extending to a stop at one side of a panel member forming one edge of the conveyor belt, and at the other edge of the conveyor belt being retained by a pin inserted through a transverse aperture in the eye, and at least one hook attached to one side of the panel members which engages a web at the edge of the laterally adjacent panel member.

4 Claims, 4 Drawing Figures

APRON OR PLATE BELT CONVEYOR

The present invention relates to an apron or plate belt conveyor, comprising a plurality of plate-shaped members made of plastic material, which members are provided on two opposite plate edges with a plurality of spaced, closed eyes, which eyes are integrally connected to said plastic plates and which are each adapted to be inserted into the spaces between the eyes of adjacent plate members and connected thereto by means of transverse rods to form the conveyor belt, according to published German Patent Application No. P20 49 129.6.

Applicant's prior plate belt conveyor as shown in said published application is improved according to the invention in the following respects: Assembling of the individual members or links to form a conveyor belt is facilitated, thereby paying attention particularly to the fact that the members are capable of withstanding high tensile loads both in the longitudinal and transverse directions relative to the direction of conveyance. Besides, it is thereby possible to easily modify the members in such a manner that even curved transportation paths can be travelled over by the conveyor.

These objects are solved by a plate belt conveyor characterized by transverse rods which on one side of the belt are pushed against a stop and on the other side of the belt retained by a pin inserted into the aperture of said eye, and at least one hook attached to one side of said members, which hook overlaps a web at the edge of laterally adjacent member.

The improved belt conveyor can be assembled in a particularly rapid and easy manner because, on the one hand, a stop is provided for the rod inserted through the members and because, on the other hand, a pin is simply inserted transversely of the aperture of the eye. Thus, it is no longer necessary to provide the rod per se with an enlargement at its end. Besides, the novel solution is by far less susceptible to contamination. Furthermore, the overlapping hooks permit precise alignment the members with each other in lateral direction such that high tensile loads can be taken up also in lateral direction. Similarly, the tensile force which can be exerted in the direction of conveyance, is at least as high as in the conventional belt conveyors. As explained in greater detail below, by means of members slightly trapezoidal shape a conveyor belt travelling over a curved path can be designed, too.

In view of the fact that in the finally assembled belt the members on one side thereof have unoccupied hooks protruding therefrom, it is proposed that these hooks be easily removable. This can be realized e.g. by means of a buckling groove provided at the edges of the hooks. Such a groove does not materially affect the tensile loading capability of the hook. When the hooks have been removed, the belt is completely smooth at this place since every protruding part has been removed.

In order to increase the tensile loading capability in the drawing direction, the individual eyes are interconnected by sturdy webs which are positioned substantially in the drawing direction.

If the plate belt conveyor is to be used for a curved path of conveyance, it is proposed to construct the members with an approximately trapezoidal outline. This means that one of the short sides is slightly wider than the other which in the travel over a curved path is directed inwardly. If the plate belt conveyor consists of a plurality of members in side-by-side relation, the inner short sides of the members are formed to correspond precisely to the outer short sides of the next inner member. On principle, it is thereby possible to construct curved belts of any desired width. Finally, it is proposed to provide at least one of the columns of members travelling in tandem, with a guide web on the lower side. If such guide web is guided between a pair of guiding jaws mounted to the sliding surface underneath the belt, the belt can be precisely guided in the direction of conveyance.

Details of the blet are evident from the following specification by referring to the accompanying drawings, wherein.

Figure 3:
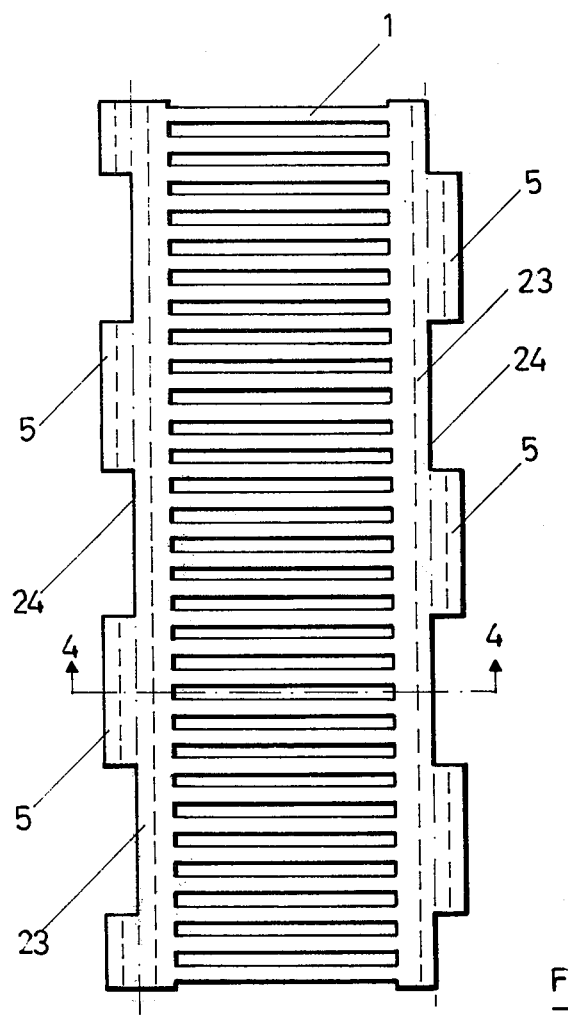
Figure 4:
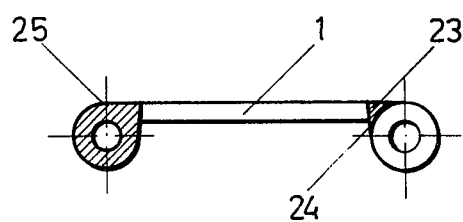

FIGS. 3 and 4 another embodiment of the invention.

Figure 2:
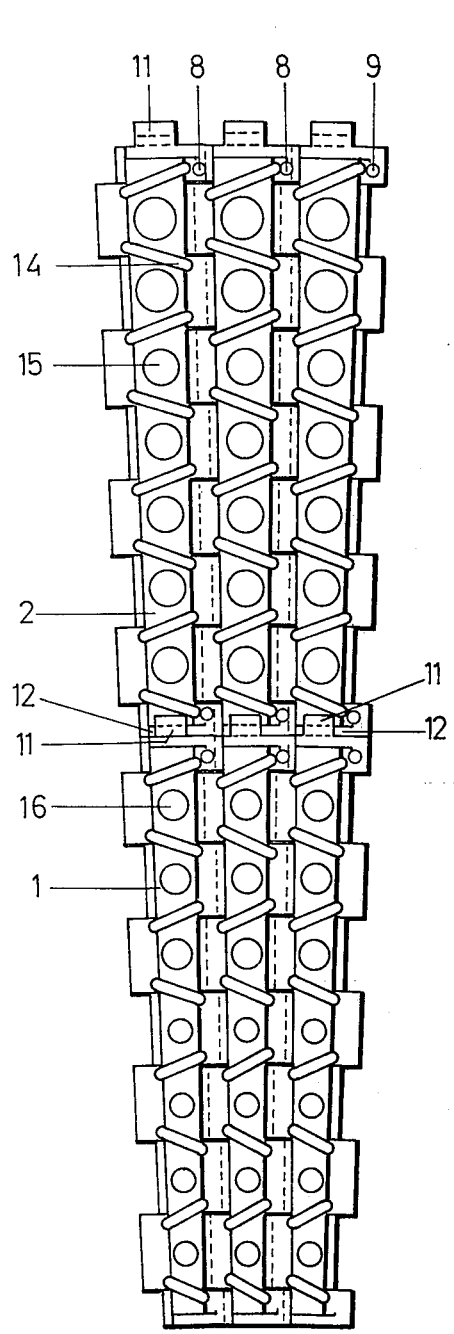
FIG. 2 is a part view of the conveyor belt from below.
Figure 1:
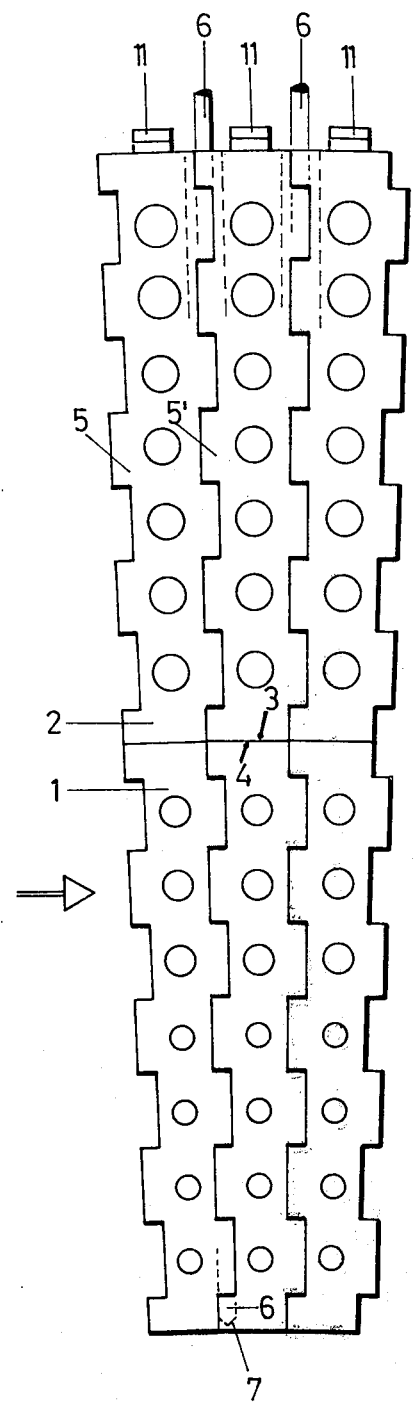
FIG. 1 shows a plan view of part of the conveyor belt.

As can be seen from FIGS. 1 and 2, the conveyor belt comprises links or members 1 and 2 which are disposed laterally and in series. In the embodiment shown, the members are combined into a conveyor belt travelling over a curved path conveyance.

Although the innermost member 1 has the same longitudinal dimension as member 2, it has shorter sides. Hereby, the sides are matched in such a manner that the length of side 3 corresponds to that of side 4 of the adjacent member. Due to this dimensioning, it is possible that the members are adapted to travel precisely over a predetermined radius of a path of conveyance.

In addition to the trapezoidal members shown, there may also be used such members which have an exactly rectangular cross-section or outline and which are suitable for straight paths of conveyance.

The members are interconnected by protruding eyes 5, 5'. These eyes each extend into the gap between the eyes of the next adjacent member, whereby the longitudinal bores provided in the eyes are aligned with each other. A transverse rod 6 is inserted through these bores and pushed through to abut a stop 7. Hereby, the length of the transverse rod 6 is selected such that its free end, in the hingedly connected condition, disappears within one of said members (this condition being not shown). At the side edge of said member, there are provided transverse bores 8 into which pins 9 may be inserted which extend through the aperture of the eye 5 and which prevent the rod from moving out from its inserted position. When the pins 9 are removed, the members may be detached again and the rods may be withdrawn.

In lateral direction, the members are fixed to each other by means of hooks 11 which are pushed over webs 12 of the respective abutting member. In the assembled condition, the hooks and the web are on the lower side of the belt such that they do not disturb the optimum smooth upper surface. The hooks 11 consist of the same material as the members of the conveyor belt. They are shaped in such a manner that they may be easily broken off in upward direction. This construction is desirable if the assembled belt has at its lateral edge free hooks protruding outwardly. When the hooks 11 are removed, the belt is smooth and without any projections on both lateral edges thereof. In this way, it is much easier to keep the belt clean on its lateral edges and to guide it without tilt.

As can be seen from FIG. 2, on the lower side the eyes 5, 5' are interconnected by sturdy webs 14. These webs 14 extend substantially in the direction of conveyance, and they result in a substantially higher tensile loading capability than in the belt according to published German Application No. P20 49 129.6. A plurality of apertures 15, 16 are formed intermediate such webs, through which apertures fresh air may be blown through the belt from below. This is necessary especially when the belt serves to convey articles which must be cooled (e.g. baked bread).

As an alternative construction, it is proposed to provide one of the columns of the members, preferably the column travelling in a center position, with elements which include a depending web. Such web may be guided between a pair of jaws positioned on the support of the belt. This guiding arrangement prevents the belt from performing lateral oscillating movements.

Further reference may be made to the fact that each eye 5 extends into the gap between a pair of eyes 5' to such degree that no gap is formed between a pair of successive members even if the belt is curved in its plane. This is obtained in that the side which defines the gap has an overlapping, circularly recessed edge with sharp points which encloses the eye inserted into said gap laterally and from above. In these respects, a similar construction as in FIG. 2 of published German Application No. P20 49 129.6 is provided.

What we claim is:

1. In a platform conveyor, the combination comprising two laterally adjacent, interconnected rows each having a plurality of flat panel members of plastic material hingedly connected together along transversely extending edges thereof, the upper surface of said flat panel members being adapted to support a load, a plurality of integrally formed eyes along each transversely extending edge of each of said panel members and being aligned to receive an interconnecting transverse bar member which connects both rows of said panel members together to form a conveyor belt, the eyes on one transversely extending edge of each panel being staggered relative to the eyes on the opposite edge thereof, said transverse bar member extending to a stop at one side of a panel member forming one edge of the conveyor belt, and at the other edge of the conveyor belt being retained by a pin inserted through a transverse aperture in said eye, and at least one hook attached to one side of said panel members, which hook engages a web at the edge of the laterally adjacent member.

2. Platform conveyor of claim 1 wherein said hooks are removable so as to provide an assembled belt without projections on both edges thereof.

3. Platform conveyor of claim 1 wherein the panel members have a trapezoidal shape thereby enabling said conveyor to travel in a curved path.

4. Platform conveyor of claim 1 wherein the integral eyes are interconnected by sturdy webs on the underside of said panels.

* * * * *